United States Patent [19]

Wineland et al.

[11] Patent Number: 4,975,891
[45] Date of Patent: Dec. 4, 1990

[54] VEHICLE SENSING DEVICE AND METHOD

[75] Inventors: William C. Wineland; Ralph S. Hebbert, both of Silver Spring, Md.; Edward H. Hug, McLean, Va.

[73] Assignee: The United States of America as represented by the Secretary of the Navy, Washington, D.C.

[21] Appl. No.: 14,830

[22] Filed: Feb. 13, 1970

[51] Int. Cl.⁵ .............................................. H04B 1/06
[52] U.S. Cl. ..................................... 367/136; 340/566
[58] Field of Search .................. 340/15, 16 R, 34 R, 340/258 D, 261, 3, 5, 6, 565, 566; 324/77 A–77 J; 181/0.5; 343/5 SA; 367/135, 136; 102/206, 427

[56] References Cited

U.S. PATENT DOCUMENTS

| 2,368,953 | 2/1945 | Walsh | 367/135 |
| 3,147,467 | 9/1964 | Laakmann | 340/566 |
| 3,258,762 | 6/1966 | Donner | 367/136 |
| 3,261,009 | 7/1966 | Stetten et al. | 367/136 |
| 3,296,587 | 1/1967 | Baker | 367/136 |
| 3,337,800 | 8/1967 | Halley et al. | 324/77 D |
| 3,431,405 | 3/1969 | Dawson | 324/77 G |

Primary Examiner—Nelson Moskowitz
Assistant Examiner—Daniel T. Pihulic
Attorney, Agent, or Firm—Kenneth E. Walden

[57] ABSTRACT

A land vehicle sensing device includes a geophone for detecting vibratory signals and a bandpass amplifier for limiting the electrical output of the geophone to those signals indicative of land vehicles. A real-time frequency analyzer provides a normalized power density spectrum signal which is threshold detected and averaged to provide an indication of land vehicle intrusion.

10 Claims, 3 Drawing Sheets

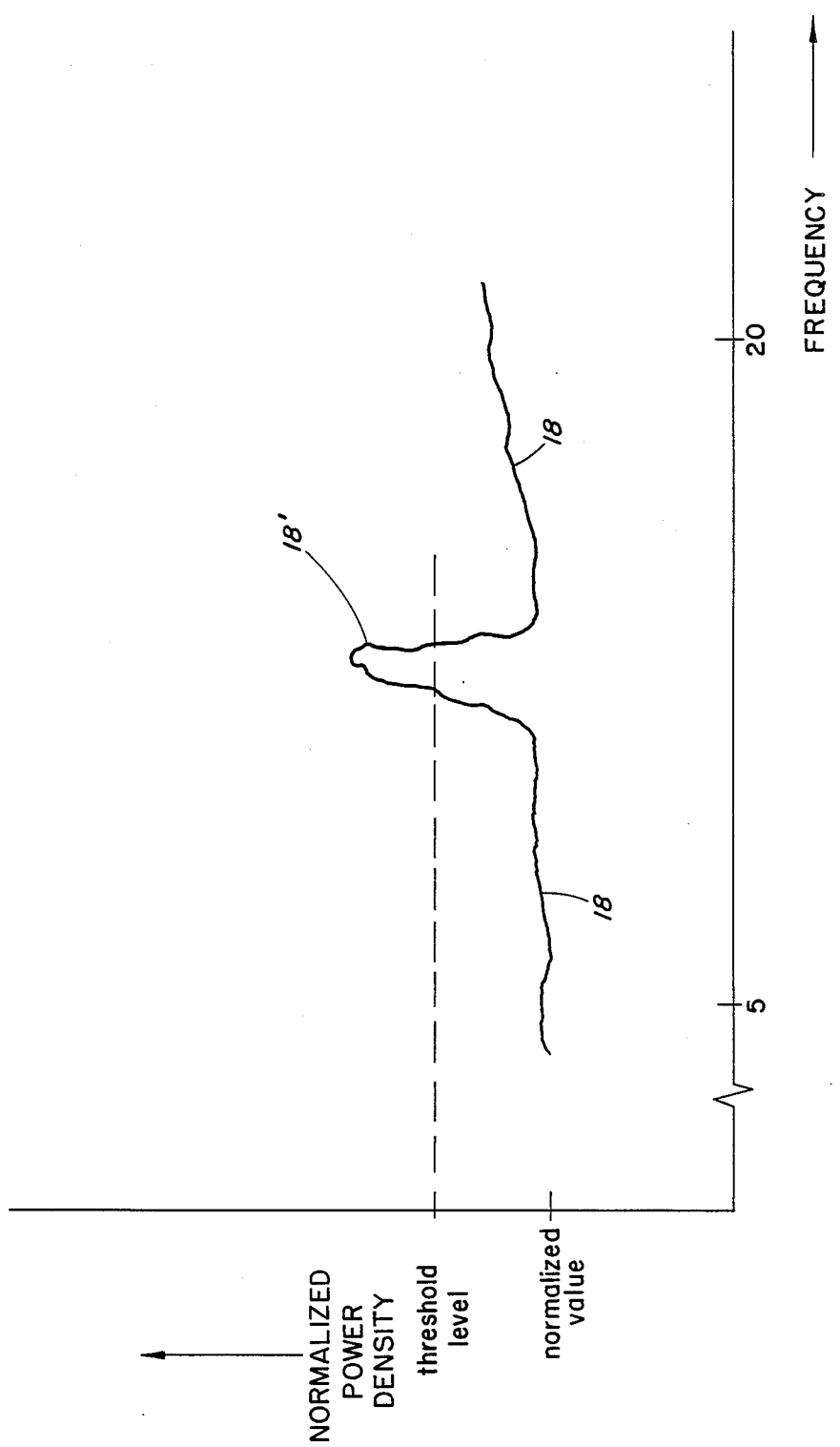

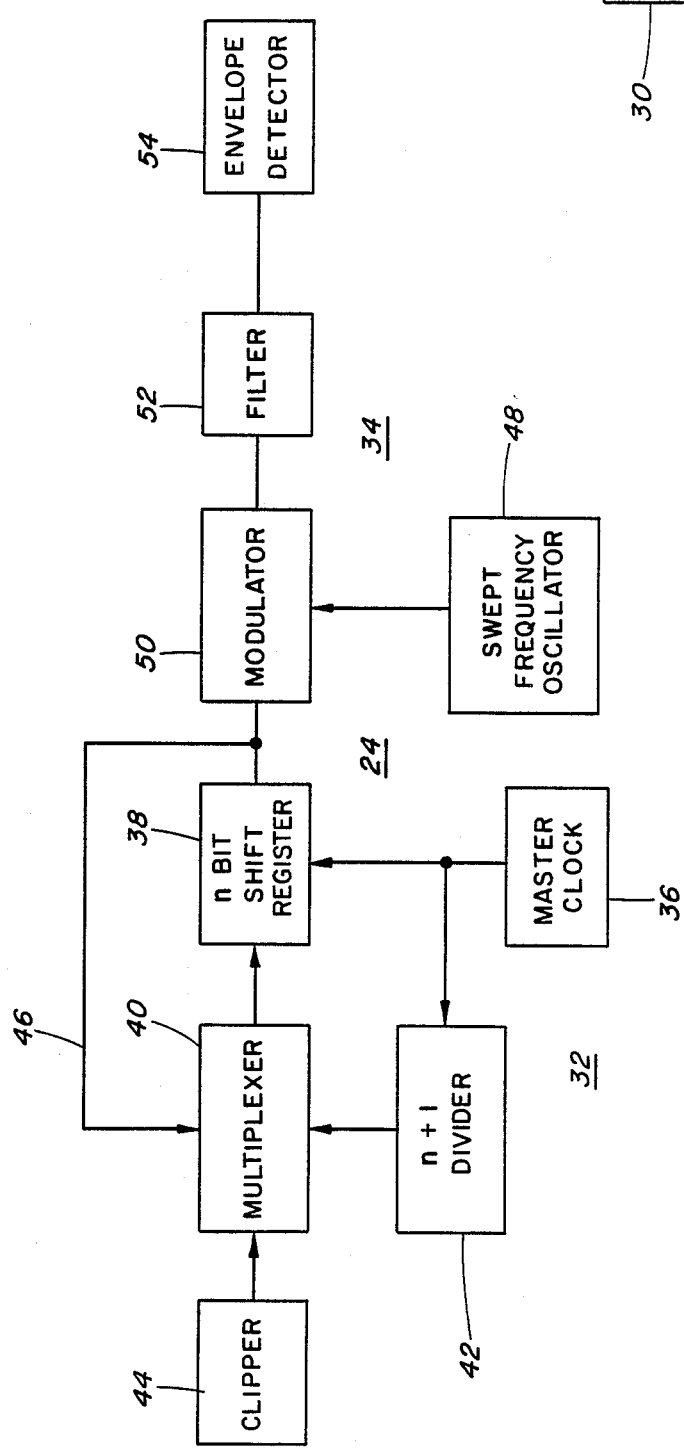

VEHICLE SENSING DEVICE AND METHOD

BACKGROUND OF THE INVENTION

This invention relates generally to sensing devices and more particularly to a land vehicle sensing device.

Prior art sensing devices have been devised to detect the intrusion of objects into a specified area. These devices have required direct contact with such objects or have set up an acoustic or electromagnetic wave pattern which is subject to disturbance or distortion by the intruding objects. These devices, however, have provided but a small sensing radius, have presented logistics problems, and are complex or otherwise somewhat undesirable.

Present day sensing devices have been devised which have reduced the hereinbefore mentioned undesirable features of the prior art sensing devices by utilizing a geophone or other seismic apparatus which sense vibrations of the ground or other point of reference caused by the intrusion of the objects. The output from the geophone is a low frequency electrical signal whose varying voltage is an electrical analog of the ground vibration. The output electrical signal may be utilized to frequency modulate an audio output to produce an audible signal whose frequency variations are proportional to ground vibration or may be utilized to trigger an alarm device or the like. These present day sensing devices have been somewhat unsatisfactory in that they have been unable to discern automatically between the sources of various sensed signals. More particularly, wind, small animals or the like have triggered the alarm device or the like to give a false indication of object intrusion. Furthermore, the present day sensing systems have been unable to reliably distinguish between the presence of various objects such as the presence of personnel and land vehicles.

SUMMARY OF THE INVENTION

Accordingly, one object of the present invention is to provide an intrusion sensing device.

Another object of the present invention is to provide a sensing device for detecting the intrusion of land vehicles.

A still further object of the instant invention is to provide an intrusion sensing device immune to microseisms, wind and other spurious conditions.

Another object of the instant invention is to provide an intrusion sensing device which can distinguish between land vehicle and personnel intrusions.

A still further object of the instant invention is to provide a method for detecting a particular intruding object.

Briefly, these and other objects of the present invention are attained by providing an intrusion sensing device having an output signal responsive to a predetermined frequency band of interest. A normalized power density spectrum of the output signal is obtained and analyzed to give an indication of the presence of land vehicles.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawings wherein:

FIGS. 1(a) and 1(b) are graphical views of the power density spectrum of various intrusion conditions;

FIG. 2 is a block diagrammatic view of the vehicle sensing device of the present invention; and FIG. 3 is a block diagrammatic view of one embodiment of the frequency analyzer utilized in the sensing device of FIG. 2.

DESCRIPTION OF THE PREFERRED EMBODIMENT

Figure 1A:
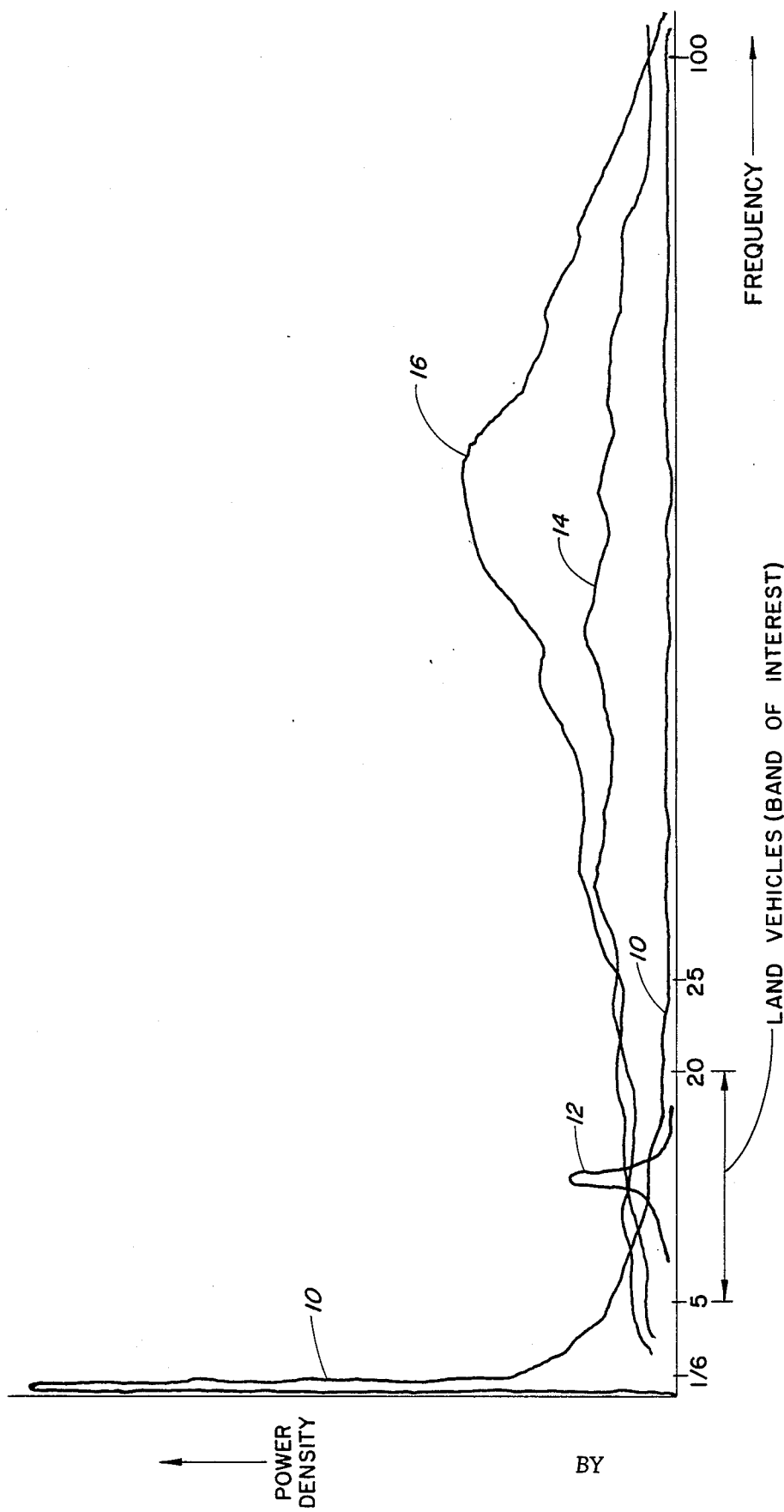

Intruding objects or other conditions produce seismic or vibratory waves in the ground or other point of reference. As hereinafter more fully explained, these vibratory waves are sensed by a geophone or other seismic sensing device and provide output signals having a particular power density spectrum signature depending on the nature of the intruding object or other condition producing the vibratory waves.

Referring now to the drawings and more particularly to FIG. 1(a) thereof, the power density spectrum for various intrusion conditions are shown. More particularly, power density spectrum signatures 10, 12, 14 and 16, corresponding, respectively to vibrations caused by noise or microseisms, land vehicles, wind and personnel are shown. The spectral noise 10 is of a high value at very low frequencies and decreases in value at larger frequencies. Power density signatures 14 and 16 corresponding, respectively, to wind and land vehicles, are broad type signals. More particularly, the power density spectrum 14 of wind may be present over most of the entire frequency range detected by the geophone. Similarly, the power density spectrum 16 corresponding to personnel intrusion occurs primarily between 25 and 100 hertz but may also have a component at lower or higher frequencies. It is to be noted, however, that the power density spectra due to wind, personnel and, above very small frequencies, due to noise is somewhat flat. More particularly, power density spectrum signals 14 and 16 have a small Q, where Q is a figure of merit indicative of power density sharpness. In contradistinction, the power density spectrum signature 12 corresponding to land vehicles is a sharp or high Q signal occurring within a frequency range or band of interest from approximately 5 to 20 hz.

It is to be noted that while the amplitudes of the various power density signatures may vary, depending on such factors as the severity of the particular intrusion condition, distance from the seismic sensor, nature of the transporting media between the occurrence of the condition and the sensor, or the like, within the band of interest for land vehicles, that is between approximately 5 and 20 hz., the signatures 10, 14 and 16 are relatively flat while the signature due to land vehicles is sharp.

FIG. 1(b) illustrates the normalized power density spectrum formed by the superposition of signatures 10, 12, 14 and 16 within the land vehicle band of interest. It is to be noted that since the power density spectrum signatures 10, 14 and 16 are relatively flat in this band of interest, the composite normalized power density sepctrum is also relatively flat for a portion 18. If, however, a land vehicle is detected, the normalized power density signature will include a sharp peak 18' indicative of the superposition of power density signature 12 on signatures 10, 14 and 16. Thus, by analyzing the normalized power density spectrum produced by the geophone or seismic sensor for the occurrence of a sharp peak, the intrusion of land vehicles is detected despite the presence of wind, personnel or other interferring vibrations.

FIG. 2 of the drawing illustrates the vehicle sensing device of the present invention as including a seismic sensing device, such as a conventional geophone 20, mounted in an area to be protected from vehicle intrusion. The geophone may be connected to or buried in the ground or otherwise connected to a point of reference. The geophone is connected to a bandpass amplifier 22 adapted to be tuned to a band of frequencies from approximately 5 hz. to 20 hz., corresponding to the land vehicle frequency response, which, in turn, is connected to a real-time frequency analyzer 24. The output of the frequency analyzer is coupled to a threshold detector 26 and an averager 27 having an output terminal 28 which may be connectable to a utilization circuit 30. By way of example, utilization circuit 30 may be an alarm circuit or a detonation circuit or the like or any other circuit in which it may be desirable to respond to land vehicle intrusion.

In operation, geophone 20 responds to vibrations or seismic waves produced by object intrusion, such as vehicle or personnel intrusion into a specified area, as well as to other vibratory producing phenomena, such as wind, distant explosions or the like to provide an output voltage of various frequencies depending on the particular sensed condition. The voltage output signal is amplified in bandpass amplifier 22 which also serves to pass only that portion of the voltage output having frequencies within the band of interest for land vehicles. The frequencies of the passed voltage are analyzed in frequency analyzer 24 which provides an output signal proportional to the normalized power density spectrum signature shown in FIG. 1 (b). The power density spectrum output is impressed at the input of a conventional threshold detector 26 and averaged in a conventional averager 27, such that an output is provided at terminal 28 thereof if the amplitude of the power density spectrum exceeds a predetermined value thereby producing an alarm or other indication of land vehicle intrusion at utilization circuit 30. More particularly, an output is provided at terminal 28 only if a narrow peak 18' is detected above a threshold level. To insure that a spurious, narrow peak, occurring only for a short time, will not cause an output at terminal 28, averager 27 provides an output to terminal 28 only if the threshold output lasts for a predetermined time.

Frequency analyzer 24 provides an output signal proportional to the normalized power density signature occurring within the band of interest for land vehicles. While it may be possible for frequency analyzer 24 to include a bank of parallel bandpass filters, each tuned to a small, different, discrete frequency expected to be sensed, this arrangement is bulky or otherwise undesirable.

One preferred embodiment of the frequency analyzer 24 of the land vehicle detection device is shown in FIG. 3 as including a delay line time compressor 32 and a swept-filter heterodyne analyzer 34. The signal sample is stored in digital form in a recirculating delay line, the output of which is fed into a heterodyne frequency analyzer. By utilizing such a configuration, frequency analysis in real time is achieved.

More particularly, a master clock 36 or other frequency standard provides timing pulses to a shift register 38 having n-bits, where n is any desired number, so that the shift register is shifted at a rate determined by the frequency of the master clock. The output of master clock 36 also controls a multiplexer 40 or other electronic switch via an n+1 divider 42 connected therebetween. A clipper circuit 44 provides a binary input to the multiplexer dependent on the polarity of the output voltage of bandpass amplifier 22. Thus, the signal analyzed is a normalized signal dependent merely on the polarity of the bandpass output voltage and inpedendent of its magnitude. This enables the threshold 26 to be set at a predetermined value above the flat, normalized spectrum 18 so that the threshold responds only to peak 18'. The other input to the multiplexer is provided by a feedback loop 46 from the shift register output.

In operation, the n bits of the shift register are filled with a digital signal, normally zero or one, representing the binary input from clipper 44. The shift register is shifted at a frequency $f_c$, where $f_c$ is the master clock frequency. The shift register output is fed back, via feedback path 46 to multiplexer 40 which is such that the shift register output is recirculated back into the shift register. After each $f_c/(n+1)$ signals from the master clock, the output from divider 42 switches multiplexer 40 from feedback loop 46 to clipper 44 so that a new binary signal is fed into the shift register. The new shift register word is then recirculated via feedback loop 46 and the process repeated. In this way, delay line time compressor 32 provides a speed up ratio and consequent frequency multiplication of the digital input signal.

The output from the delay line time compressor is fed to a swept-filter heterodyne analyzer 34. More particularly, the output from shift register 38 is modulated with a swept frequency signal provided by a swept frequency oscillator 48 in a modulator 50. The modulated output is passed by way of a bandpass filter and an envelope detector 54 to provide an output proportional to the power density spectrum of the voltage passed by bandpass amplifier 22.

A more complete description of a frequency analyzer similar to that of FIG. 3 may be found in the Journal of the Acoustic Society of America, Vol. 38, No. 6, Dec. 1965, at page 1031 in an article entitled "Real-Time Electronic Spectrograph for Analysis of Acoustic Transients" by J. F. Germano, R. Halley, and W. B. Allen.

It will be readily apparent, therefore, that the land vehicle sensing device according to the instant invention provides a detection of land vehicles by frequency analyzing the seismic waves associated with such vehicles and excluding from such analysis seismic waves associated with other intrusion conditions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An object sensing device comprising
   means for sensing vibratory conditions in an area and for providing an electrical signals proportional to said vibratory conditions,
   means for selecting those electrical signals having a predetermined frequency range corresponding to the frequency range of a particular sensed condition, means for supplying, a signal proportional to the normalized power density spectrum of said electrical signals, and means for providing an output signal when the amplitude of said normalized power density spectrum signal is above a predetermined value indicative of the occurrence of said particular sensed condition in said area.

2. An object sensing device according to claim 1 wherein
said normalized power density spectrum signal above said predetermined value is a sharp peak.

3. An object sensing device according to claim 2 wherein
said particular sensed condition corresponds to land vehicle intrusion into said area.

4. An object sensing device according to claim 3 wherein
said means for sensing vibratory conditions is a geophone.

5. An object sensing device according to claim 4 wherein
said means for selecting those signals having a predetermined frequency range is a bandpass amplifier.

6. An object sensing device according to claim 5 wherein
said means for analyzing said electrical signals is a real-time frequency analyzer.

7. An object sensing device according to claim 6 wherein
said real time frequency analyzer includes means for multiplying the frequencies of said electrical signals applied to said analyzer and means for analyzing said multiplied frequencies.

8. An object sensing device according to claim 7 wherein
said means for multiplying said frequencies of said electrical signals is a delay line time compressor, and
said means for analyzing said multiplied frequencies is a swept-filter heterodyne analyzer.

9. An object sensing device according to claim 1 further including
means for averaging said output signal whereby spurious short time signals above said predetermined value are unable to supply an output signal to a utilization device.

10. An object sensing device according to claim 9 wherein said predetermined frequency range between 5 Hz and 20 Hz whereby land vehicles may be detected.

* * * * *